(12) United States Patent
McLennan

(10) Patent No.: US 8,128,358 B2
(45) Date of Patent: Mar. 6, 2012

(54) LOW MASS FAN SHROUD WITH INTEGRATED MEMBRANE BARRIER

(75) Inventor: Paul Stephen McLennan, London (CA)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 1201 days.

(21) Appl. No.: 11/902,447

(22) Filed: Sep. 21, 2007

(65) Prior Publication Data

US 2008/0072851 A1 Mar. 27, 2008

Related U.S. Application Data

(60) Provisional application No. 60/826,624, filed on Sep. 22, 2006.

(51) Int. Cl.
*F01P 11/10* (2006.01)

(52) U.S. Cl. .................................. 415/213.1; 415/201

(58) Field of Classification Search .............. 123/41.49, 123/41.7; 415/201, 211.2, 213.1; 416/169 A; 417/423.15
See application file for complete search history.

(56) References Cited

U.S. PATENT DOCUMENTS

| | | | | |
|---|---|---|---|---|
| 3,854,459 A | * | 12/1974 | Stimeling | 165/98 |
| 4,756,279 A | * | 7/1988 | Temmesfeld | 123/41.04 |
| 6,106,228 A | * | 8/2000 | Bartlett | 415/146 |
| 7,669,557 B2 | * | 3/2010 | Kojima | 123/41.11 |

* cited by examiner

*Primary Examiner* — Edward Look
*Assistant Examiner* — Ryan Ellis
(74) *Attorney, Agent, or Firm* — Manelli Selter PLLC; Edward J. Stemberger

(57) ABSTRACT

An engine cooling fan shroud structure (20) for a vehicle includes a skirt (12') defining a frame. The frame has a certain wall thickness and defines an opening (22) therein constructed and arranged to permit air to pass through the skirt. The skirt includes motor mount structure (14) supported in the opening and constructed and arranged for mounting a fan motor thereto. The frame defines passageways (18) therethrough to reduce an amount of material of the skirt. A film material (28) has a wall thickness substantially less than the certain wall thickness and covers the passageways such that air may flow mainly through the opening.

17 Claims, 5 Drawing Sheets

LOW MASS FAN SHROUD WITH INTEGRATED MEMBRANE BARRIER

This application claims the benefit of the earlier filing date of U.S. Provisional Application No. 60/826,624, filed on Sep. 22, 2006, which is incorporated by reference herein in its entirety.

FIELD OF THE INVENTION

This invention relates to a low mass, automotive engine cooling fan shroud preferably molded from plastic.

BACKGROUND OF THE INVENTION

With reference to FIG. 1, a conventional plastic automotive cooling fan shroud is shown generally indicated at 10. The shroud 10 is of box shape having a skirt 12 and a motor mount 14 coupled to the skirt by a plurality of arms 16. The skirt 12 is solid and encloses the entire area of a radiator core to which the skirt 12 is mounted.

A number of techniques have been used to improve performance or reduce shroud mass of the conventional shroud. Some suppliers of cooling fan modules remove a shroud skirt entirely and use only a ring shroud and support beams to hold the cooling fan in position behind the radiator. Although this concept results in a shroud of minimum mass, the cooling performance of the fan module is compromised when the vehicle is stationary. Suppliers of fan modules have also provided a box shroud where corners of the shroud are missing or the shroud only covers about half of the radiator core. With this structure, degradation in cooling performance between stationary and highway conditions occurs.

Supplier of fan modules have also attempted to incorporate openings into the shroud skirt which usually have some type of plastic door or rubber flap that will open when acted upon by airflow passing through the heat exchanger at high vehicle speeds. A supplier has also created a cooling fan shroud with elongated openings (no doors) formed in the shape of a nozzle to allow air to pass through easily in one direction but not the other.

Other suppliers have attempted to reduce shroud mass by employing thermoplastic resins with a lower density such as polypropylene. However, the performance of the material is inferior to nylon grades of material at elevated temperatures.

There is a need to provide a low mass fan shroud that does not result in degradation in cooling performance between stationary and highway conditions.

SUMMARY OF THE INVENTION

An object of the present invention is to fulfill the need referred to above. In accordance with the principles of the present invention, this objective is obtained by providing an engine cooling fan shroud structure for a vehicle. The shroud structure includes a skirt defining a frame. The frame has a certain wall thickness and defines an opening therein constructed and arranged to permit air to pass through the skirt. The skirt includes motor mount structure supported in the opening and constructed and arranged for mounting a fan motor thereto. The frame defines passageways there-through to reduce an amount of material of the skirt. A film material has a wall thickness substantially less than the certain wall thickness and covers the passageways such that air flows mainly through the opening.

In accordance with another aspect of the invention, a method provides a low mass engine cooling fan shroud structure for a vehicle. A mold cavity and a mold core are constructed and arranged to form a shroud skirt having 1) an opening to permit air to pass there-through and 2) a passageway through the shroud to reduce material needed to form the shroud. A film material is captured in the mold cavity. Plastic is injected into the mold cavity and behind the film material so that the film material covers the passageway in the shroud skirt.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 2:
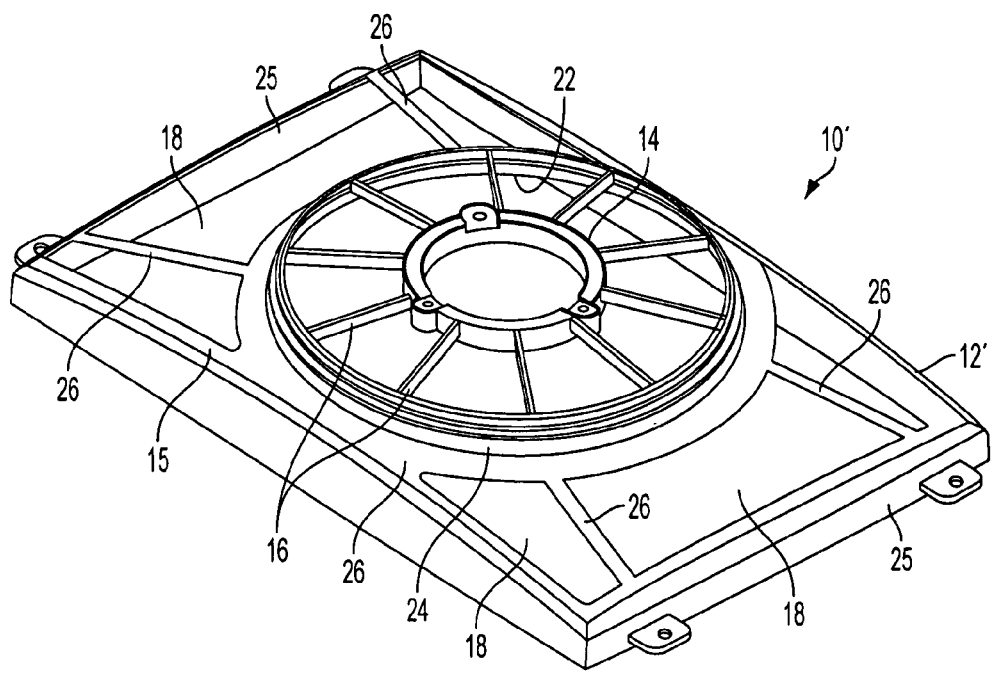
FIG. 2 is a view of a fan shroud having a skirt with passageways therein to reduce material of the shroud in accordance with the principles of an embodiment of the present invention.

With reference to FIG. 2, a shroud, generally indicated at 10', is shown in accordance with an embodiment of the invention. The entire shroud skirt 12' does not need to be formed entirely from plastic resin to meet the functional requirements of the cooling module. Thus, the skirt 12' has a generally box-like rectangular frame defining an outer surface 15 and annular rim 24 (e.g., shroud barrel) defining annular opening 22 therein that permits air to pass through the skirt 12'. A motor mount structure 14 is supported in the opening 22 and is constructed and arranged to permit a fan motor (not shown) to be mounted thereto in the conventional manner for generating airflow. The motor mount structure 14 is coupled with the annular rim 24 of the skirt 12' via a plurality of arms 16. The annular rim 22 is secured to the skirt 12' by support members 26. Thus, as in the embodiment of FIG. 2, the 2 mm wall stock is removed creating passageways 18 through the skirt 12'. The passageways 18 are provided in non-critical areas (generally surrounding the annular rim 24) to remove material while ensuring that the resulting skirt frame is stiff enough to meet the structural requirements of the application. In the embodiment, the passageways extend from sides 25 of the skirt 12' to the annular rim 24, with the support members 26 defining bounds of certain passageways 18.

Figure 3:
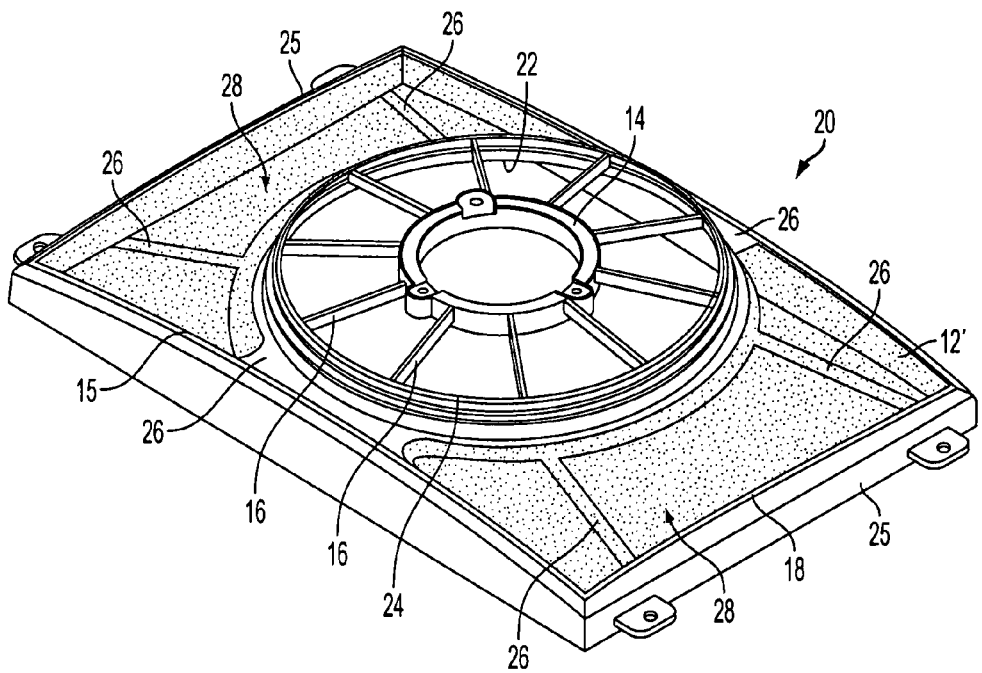
FIG. 3 is a fan shroud structure having a thin layer of film covering shroud passageways of the shroud of FIG. 2.

With reference to FIG. 3 an automotive engine cooling fan shroud structure is shown, generally indicated at 20, in accordance with the principles of an embodiment of the invention. The shroud structure 20 reduces the mass of the conventional automotive plastic engine cooling fan shroud formed by an injection molding process, such as that shown in FIG. 1. High performance engineering thermoplastics are used to form an enclosed box or shroud skirt 12' to channel airflow exiting a heat exchanger core (not shown) and entering a fan (not shown) that is coupled to the skirt. This shroud skirt 12' generally has a minimum material thickness of 2 mm to allow and good part quality.

In accordance with the embodiment of FIG. 3, surfaces defining the passageways 18 (e.g., support members 26 and portions of outer surface 15 are covered with a thin film or membrane, generally indicated at 28, preferably of plastic or other flexible material. The film 28 is substantially thinner than the 2 mm thick skirt 12'. The film 28 performs an identical function of the wall stock that was removed to create passageways 18; channeling the airflow through the rotating fan. However, the overall mass of the shroud structure 20 is lower than the shroud of FIG. 1 due to less material used in the manufacture of the shroud structure 20. In addition, degradation in cooling performance is prevented since passageways 18 are covered, preventing air from bypassing the fan opening 22 (e.g., air flows mainly through opening 22). For high speed environments, perforations 38 can be provided through the film 28 to permit air to pass through the skirt 12'. The perforations 38 can be in the form of holes of any shape, slits, slots, etc.

The use of the film 28 to cover passageways 18 of the skirt 12' can be used for either single or dual fan shrouds and is suitable for a shroud aspect ratio of >1.10, wherein the aspect ratio=shroud width/shroud height.

Figure 4:
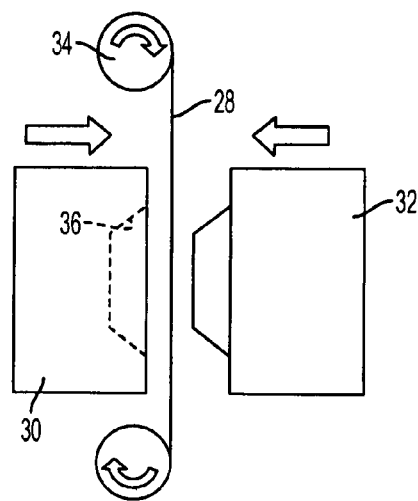
FIG. 4 is a schematic illustrating a method of fabricating the fan shroud with the film of FIG. 3.

With reference to FIG. 4, a schematic illustration of a method of fabricating the shroud structure 20 is shown. A mold is provided having a cavity side half 30 and a mating core side half 32. A continuous roll 24 of plastic film 28 is provided between the mold halves 30, 32. The plastic film 28 is captured in the mold cavity 36 after the mold is closed. Thermoplastic is injected into the cavity 36 behind the plastic film 34 thus forming an integrated barrier in the final part (shroud 20) one ejected from the mold.

Figure 5:
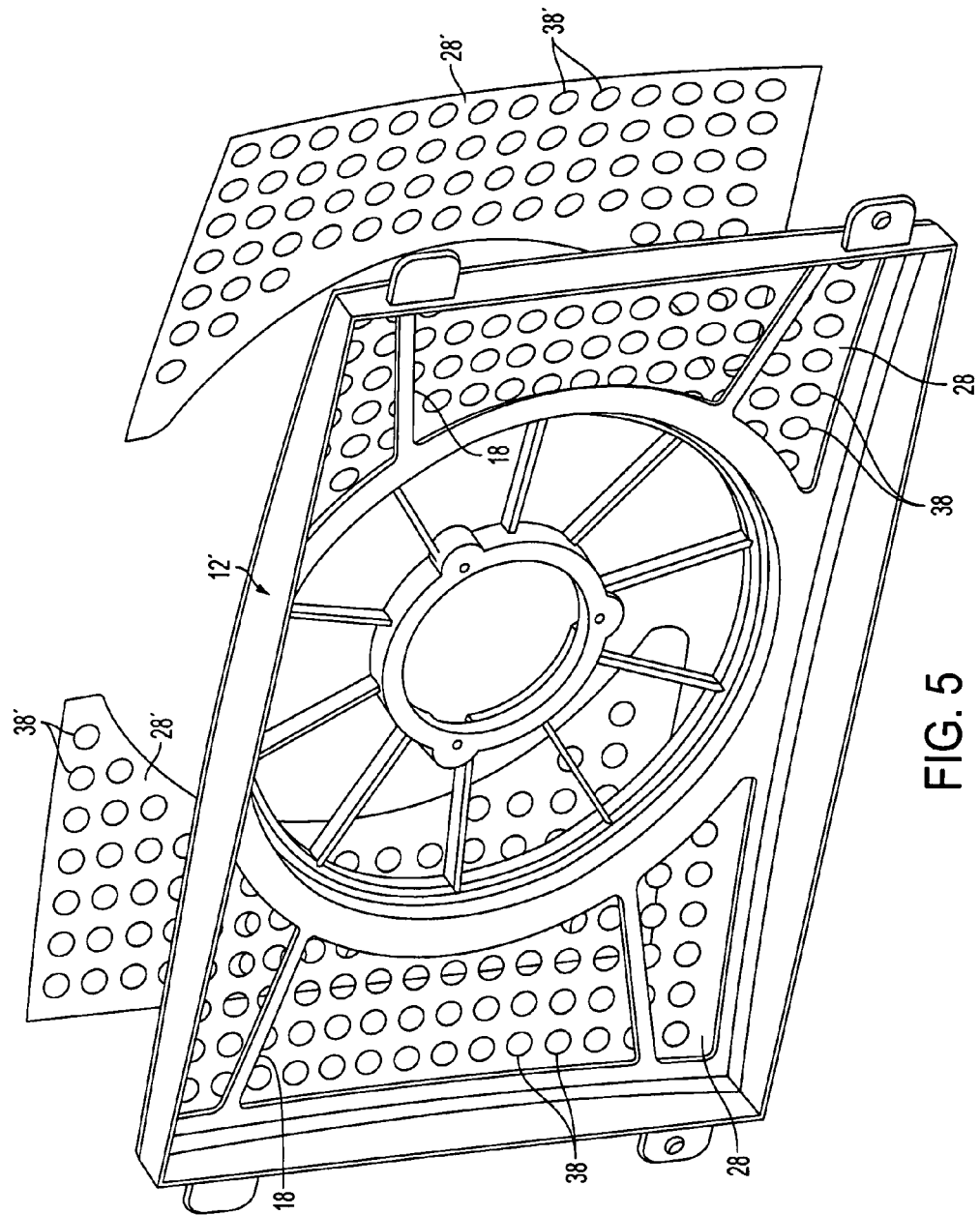
FIG. 5 shows another embodiment of a fan shroud structure having at least two layers of porous film, shown with one of the layers of film about to be attached to the shroud skirt.
Figure 6:
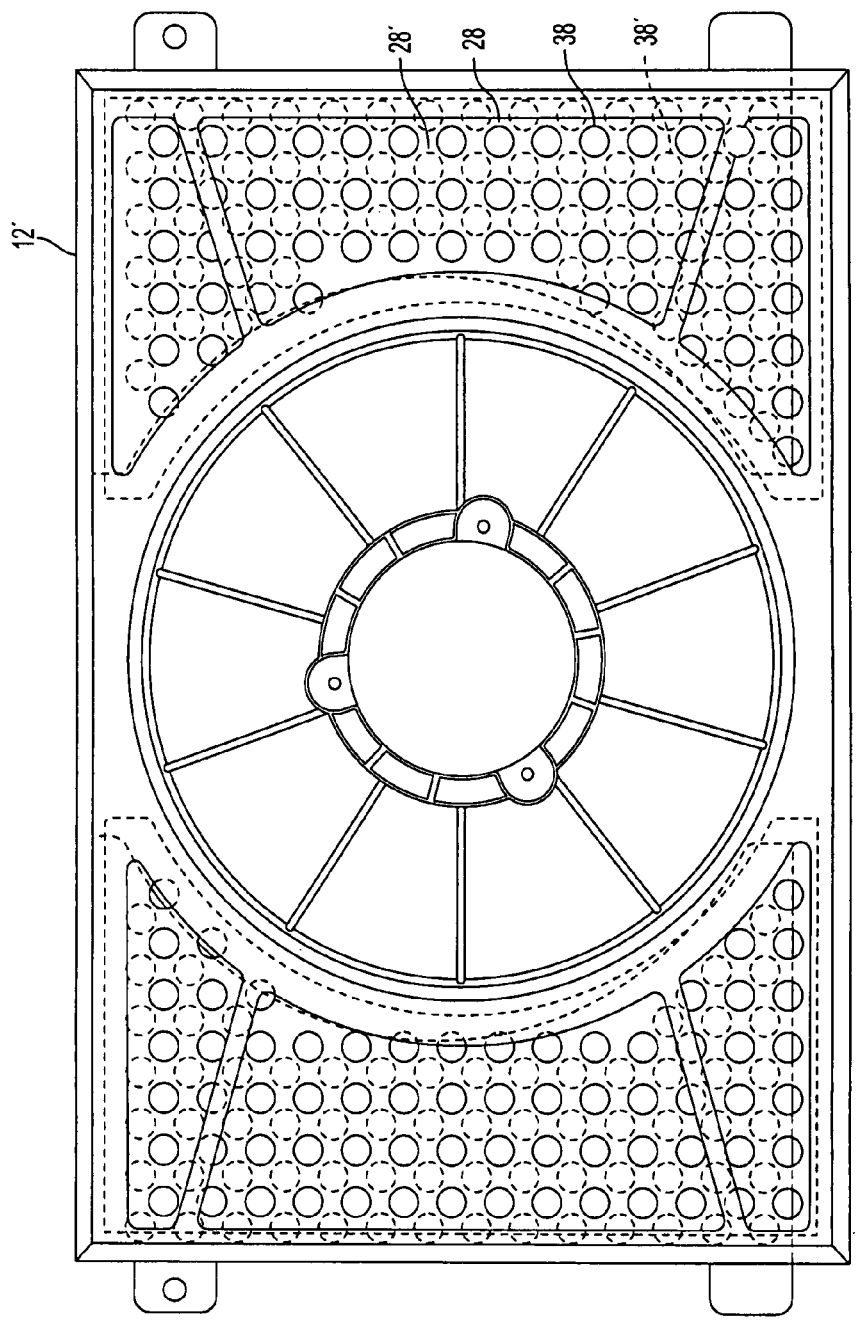
FIG. 6 is a plan view of the shroud structure of FIG. 5 showing two layers of porous film attached.

With reference to FIGS. 5 and 6, the plastic film 28 used to seal the large passageways 18 in the shroud skirt 12' (or frame) could also be semi-porous (e.g., have a plurality of bypass openings 38) to allow airflow to pass through it if fan bypass is desirable (such as at high vehicle speeds). In the embodiment of FIGS. 5 and 6, at least two layers overlapping porous film, 28 and 28' are provided with the opening 38 of one layer 28 being in a position different from openings 38' in the other layer 28', such that under low vehicle speed conditions, the fan suction draws each film layer together for an airtight seal. Under high speeds, ram air creates high pressure inside shroud and forces the film layers apart allowing air to leak through the openings 38, 38'. This gives an overall higher flow rate through the heat exchanger and better vehicle cooling.

Figure 1:
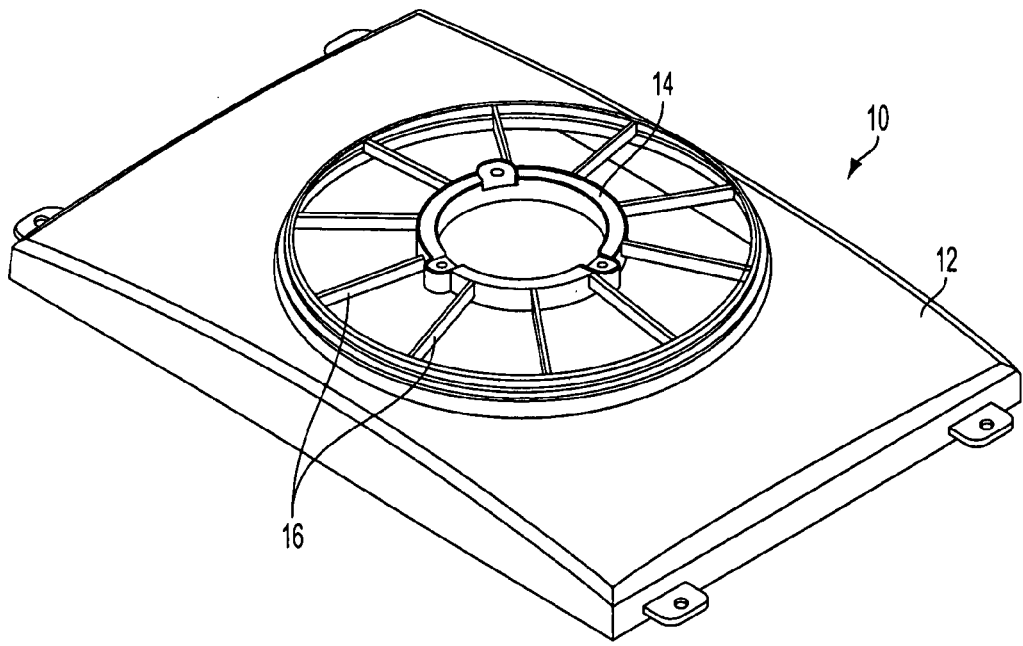
FIG. 1 is a view of a conventional fan shroud having a solid skirt.
Figure 7:
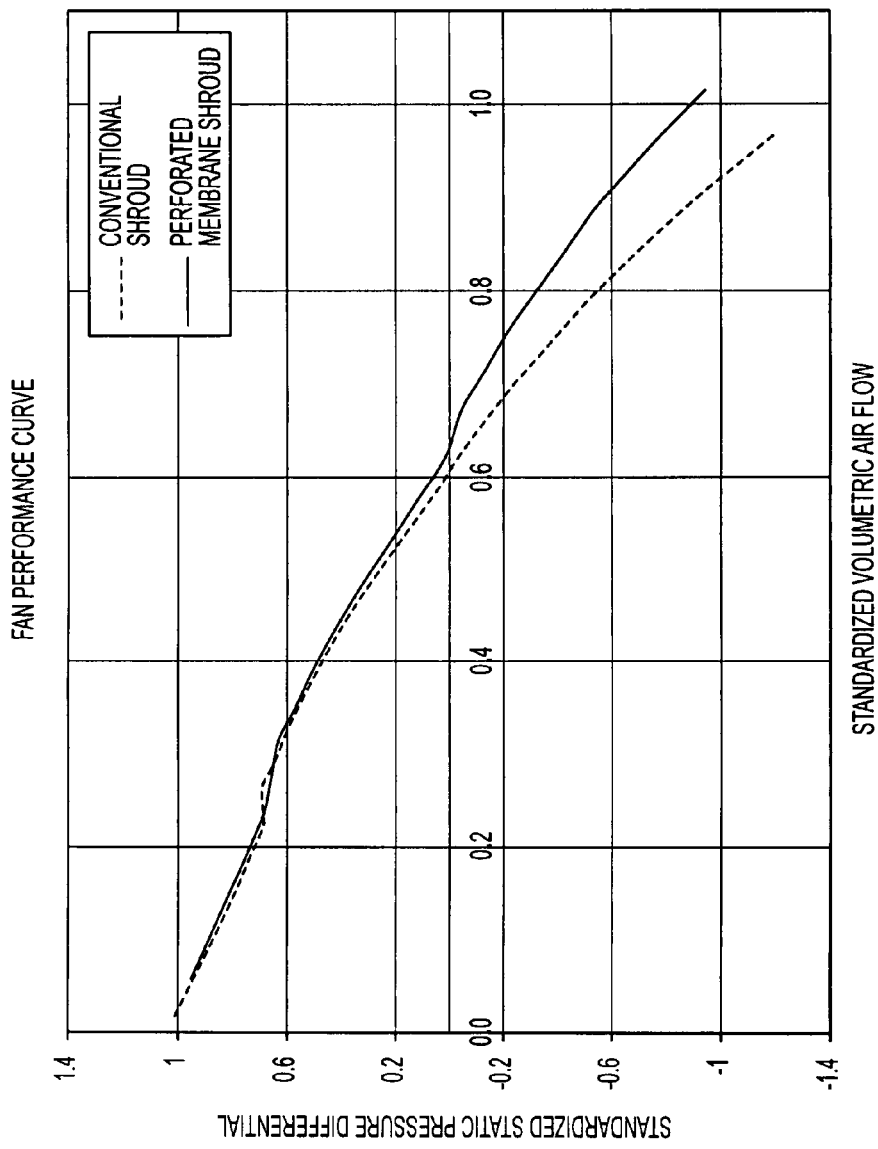
FIG. 7 is a graph showing fan performance curves of the fan shroud structure of FIG. 6 versus a solid shroud skirt.

FIG. 7 is a graph showing fan performance curves of the fan shroud structure of FIG. 6 versus a solid shroud (such as that shown in FIG. 1). As can be seen, there is improved airflow performance at higher vehicle velocities and an effect similar to ram air doors or flaps is provided. There is no degraded performance at idle and low speeds (e.g., >0 Pa dP).

Some advantages of the embodiment are as follows:
1. Openings in the shroud skirt 12' reduce cost since less overall material is used
2. Aesthetic appearance can be improved
3. Overall lower part mass improves vehicle fuel efficiency
4. Part moldability may be improved and machine cycle times may be reduced.

It is possible to use the concept of providing a thin film 28 to achieve the same result in a number of alternate manners:
1. A thin membrane or film 28 could be used to cover a shroud frame formed of stamped sheet metal or other structurally robust material. A functional shroud could be constructed in this way.
2. The plastic film 28 could be attached to the shroud skirt 12' (or frame) using other manufacturing methods besides continuous film over molding. The film could be attached using chemical adhesive, friction welding, laser welding or mechanical means, for example, as a secondary process after the plastic shroud 12' is ejected from the mold cavity.
3. The plastic film 28 used to seal the large passageways 8 in the shroud skirt 12' (or frame) could alternatively be made of paper or other inexpensive, lightweight materials.
4. The plastic film 28 used to seal the large passageway 18 in the shroud skirt 12' (or frame) could also be semi-porous (e.g., have bypass openings 38 in FIG. 6) to allow airflow to pass through it if fan bypass was desirable (such as at high vehicle speeds).
5. A continuous film molding process is proposed where the film barrier 28 is loaded into the molding die prior to thermoplastic being shot into the cavity. However, the same result could be achieved by loading discrete sheets of film 28 into the molding die for each cycle. These sheets could be individually cut from a continuous roll of plastic film or consist of a thermoformed sheet which is loaded individually into the molding die during each molding cycle.
6. Multiple layers of overlapping film 28, 28' could be attached to one shroud skirt 12' (or frame) to simulate the function of ram air doors (FIG. 6) The overlapping film layers would have to have offset openings 38, 38' or slits formed to allow airflow to pass through under certain operating conditions.
7. The plastic film 28 may be wrapped over the edges of the skirt 12' to cover openings created in the four sides thereof.
8. The plastic film 28 may be attached to either the inner surface or the outer surface 15 of the skirt 12'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An engine cooling fan shroud structure for a vehicle, comprising:
a skirt defining a frame, the frame having a certain wall thickness and defining an opening therein constructed and arranged to permit air to pass through the skirt, the skirt including motor mount structure supported in the opening and constructed and arranged for mounting a fan motor thereto, the frame defining passageways there-through reducing an amount of material of the skirt, and
a film material, having a wall thickness substantially less than the certain wall thickness, covering the passageways such that air may flow mainly through the opening.

2. The shroud structure of claim 1, wherein the frame is of generally box-like, rectangular shape.

3. The shroud structure of claim 1, wherein the skirt further includes an annular rim defining the opening, the motor mount structure being coupled to the annular rim by a plurality of arms.

4. The shroud structure of claim 3, wherein the passageways generally surround the annular rim.

5. The shroud structure of claim 4, wherein the passageways extend from sides of the skirt to the annular rim.

6. The shroud structure of claim 1, further comprising a plurality of bypass openings in the film material constructed and arranged to permit a certain amount of air to bypass the opening in the skirt.

7. The shroud structure of claim 1, wherein at least two layers of film material are provided, each layer having a plurality of bypass openings therein constructed and arranged to permit a certain amount of air to bypass the opening in the skirt, the bypass openings in one layer being disposed at a position different from a position of the bypass openings in the other layer, such that under low vehicle speed conditions, fan suction draws each layer together creating an airtight seal and under high speeds, ram air creates high pressure inside the shroud structure and forces the layers apart, allowing air to pass through the bypass openings.

8. The shroud structure of claim 1, wherein the skirt comprises injection molded thermoplastic.

9. The shroud structure of claim 1, wherein the film material comprises a plastic material.

10. The shroud structure of claim 1, wherein the film material comprises a paper material.

11. An engine cooling fan shroud structure for a vehicle, comprising:

a skirt defining a frame, the frame having a certain wall thickness and defining an opening therein constructed and arranged to permit air to pass through the skirt, the skirt including motor mount structure supported in the opening and constructed and arranged for mounting a fan motor thereto, the frame defining passageways there-through reducing an amount of material of the skirt, and means for covering the passageways such that air may flow mainly through the opening, wherein the skirt comprises injection molded thermoplastic and wherein means for covering is a film material comprised of a plastic material.

12. The shroud structure of claim 11, wherein the film material has a wall thickness substantially less than the certain wall thickness.

13. The shroud structure of claim 11, wherein at least two layers of film material is provided, each layer having a plurality of bypass openings therein constructed and arranged to permit a certain amount of air to bypass the opening in the skirt, the bypass openings in one layer being disposed at a position different from a position of the bypass openings in the other layer, such that under low vehicle speed conditions, fan suction draws each layer together creating an airtight seal and under high speeds, ram air creates high pressure inside the shroud structure and forces the layers apart, allowing air to pass through the bypass openings.

14. The shroud structure of claim 11, wherein the skirt further includes an annular rim defining the opening, the motor mount structure being coupled to the annular rim by a plurality of arms.

15. The shroud structure of claim 14, wherein the passageways generally surround the annular rim.

16. The shroud structure of claim 15, wherein the passageways extend from sides of the skirt to the annular rim.

17. The shroud structure of claim 11, further comprising a plurality of at least one bypass opening in the means for covering that is constructed and arranged to permit a certain amount of air to bypass the opening in the skirt.

* * * * *